Jan. 12, 1971  W. R. VARNELL  3,554,941
BUILDING MATERIAL MADE OF A MIXTURE OF POLYESTER
RESIN AND RICE HULLS
Original Filed Oct. 20, 1967  2 Sheets-Sheet 1

INVENTORS.
WILLIAM R. VARNELL
MANCE R. MITCHELL
BY
Christie, Parker & Hall
ATTORNEYS 3,554,941
BUILDING MATERIAL MADE OF A MIXTURE OF POLYESTER RESIN AND RICE HULLS
William R. Varnell and Mance R. Mitchell, San Antonio, Tex., assignors to Concrete Development Corporation, a corporation of Texas
Continuation of application Ser. No. 681,305, Oct. 20, 1967, which is a continuation-in-part of applications Ser. No. 366,332, May 11, 1964, Ser. No. 437,669, Mar. 8, 1965, and Ser. No. 659,830, July 6, 1967. This application Mar. 21, 1969, Ser. No. 809,434
Int. Cl. B32b *27/36;* C08f *45/16;* C08g *51/16*
U.S. Cl. 260—9
4 Claims

ABSTRACT OF THE DISCLOSURE

This invention relates to building materials made with a mixture of rice hulls and polyester resin which preferably includes fine inorganic particles in the 0.001 to 20 micron range to increase the strength of the product. The rice hulls, which may be either ground or whole, or a mixture of both, are thoroughly coated with resin or polyester resin cement, and bonded together to make a solid product which is strong, durable, inexpensive, lightweight, acid resistant, and a good electrical, thermal and sound insulator. The product is ideal for molding articles such as drainboards, wall tiles, shingles, corrugated sheets, siding, roofing, deck panels, silo doors, and frames. The product can be used either as it comes from the mold, or it can be decorated or colored with a coating of a mixture of polyester resin and pigment.

---

This is a continuation of our copending application Ser. No. 681,305 filed Oct. 20, 1967, which is a continuation-in-part application of our copending applications Ser. No. 366,332, filed May 11, 1964 (now abandoned), Ser. No. 437,669, filed Mar. 8, 1965 (now abandoned), and copending Ser. No. 659,830, filed July 6, 1967, now abandoned.

This invention includes and employs the discovery that finely divided solid inorganic aggregate or particles of matter, which are chemically inert to the various plastics or resins or monomers and mixtures thereof employed in our invention, may be utilized to stabilize and extend the shelf life of liquid plastics, resins, monomers and mixtures thereof prior to curing, and also to change or modify the structural behavior and characteristics of plastic or resinous materials in such manner as to impart added stability, strength, rigidity and adhesive qualities to such plastic materials after curing. The plastics herein described are variously referred to as "plastics," "plastic mixtures," "resins," "resinous mixtures," or "resin-monomer mixtures."

This invention further utilizes such aggregates, and such plastic materials and modifications thereof, first, to formulate adhesive resin cements of unique characteristics to be employed in bonding rice hulls together to make a solid structural material which is strong, durable, inexpensive, lightweight, water impervious, and a good insulator for electricity, heat and sound.

As used herein, the term "aggregate" describes a natural stone or sand such as a chert, traprock, granite, quartz, limestone, basalt, silica, sand, etc., or a manufactured or treated product such as burned clay, tabular alumina or blast furnace slag, used in conjunction with a cementing agent to form a solid body of desired form.

Polyester resins are the preferred plastics for use in this invention. The term "polyester resin" is used to mean a mixture of an ethylenically unsaturated alkyd resin and polymerizable vinyl monomer such as styrene. The resin chemist is familiar with polyester resins. The preferred resins of this class for employment in the concrete compositions of the invention are the polymeric ester reaction products of one or more dicarboxylic acids and one or more polyhydric alcohols. One or more of these reactants contains a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is preferred that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is a satisfactory polyhydric alcohol. An unsaturated monohydric alcohol may be used in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 40% and preferably 40% to 60% by weight of the resin and resin forming component, e.g., styrene, of the composition.

The resin should also contain a nonvolatile, monomeric, cross-linking solvent for the polyester. The function of this solvent is to make the polyester resin more fluid and also to cross-link the polyester at the time of curing to produce a cross-linked, or three-dimensional resin with the polyester which is thermosetting in character. This monomeric solvent is an important member of the resin component, for it provides the necessary fluidity to the resin component, imparts thermosetting characteristics to the cured resin and is consumed during the curing of the resin without forming volatile materials. This freedom from volatility is important for otherwise the release of volatile matter would produce bubbles, voids, or pinholes on the surface and throughout the finished coating. The lack of volatile matter permits curing when under pressure without requiring provision for vents, etc., in the molds.

Among the monomeric polymerizable solvents which may be used are styrene, vinyl toluene, e.g., o-vinyl toluene, p-vinyl toluene, and m-vinyl toluene; cyclo-pentadiene; vinyl acetate; diallyl esters, e.g., diallyl phthalate and triallyl cyanurate, as well as alphamethyl styrene. Styrene has produced the most satisfactory results thus far.

When produced commercially, these resin compositions contain a small amount of a polymerization inhibitor so as to prevent gelation during storage prior to usage. Such inhibitors include the well known antioxidants: hydroquinone, t-butyl catechol, quinone, etc.

Some of the polyester resins of the character contemplated for use in the present invention are sold in the trade and identified as "Oronite," "Polylite," "Selectron," "Paraplex," or "Vibrin" resins. In general, these resins are unsaturated high molecular weight polymers made by reacting one or more acids or a blend of acids, such as maleic of fumaric acid, with a dihydroxy alcohol, such as ethylene glycol. The specific properties of these resins very depending largely upon the type and amount of each constituent in the combination.

Examples of other high-polymer or copolymer plastics and resins or monomers used in our invention include both the thermosetting and thermoplastic materials.

Among the thermosetting resins are the epoxy, amino, alkyd, phenolic, polyester, urethane, allylic and silicone resins. Examples of the thermoplastics include nylon, polycarbonate, acrylic, acetal, vinyl, cellulosic, styrene, polystyrene, chlorinated polyether, fluorocarbon, polypropylene and polyethylene resins.

As the catalysts, there can be utilized numerous oxidizing catalysts, such as cumene hydroperoxide, dicumyl peroxide, benzoyl peroxide, and methyl-ethyl-ketone peroxide. The catalyst is usually employed in an amount of 0.5–4% of the polyester resin. Preferably, there is utilized with the catalyst a metallic drier such as manganese or cobalt naphthenate, for example. A typical example of a satisfactory catalyst-drier combination is 2% benzolyl peroxide, .75% manganese naphthenate and .75% cobalt naphthenate based on the polyester resin.

Briefly, the concrete product of our invention includes a mixture of polyester resin and rice hulls. The rice hulls are present in the amount of about 40% up to about 95% of the product by weight. The polyester resin is preferably mixed with inorganic particles in particle size to range from less than about 0.004 micron up to a maximum size of about 300 mesh to leave a minimum of unfilled gaps or voids between adjacent particles. The fine particles are present in the amount between about 1% and about 60% by weight of the combined weight of the polyester resin and fine particles.

Hereinafter those inorganic particles of aggregate larger than about 20 microns are referred to as "aggregates," and those finer than about 20 micron size are referred to as "finely divided particles" or "fine particles." The finely divided particles are selected from materials of high strength (as distinguished from "fillers") and essentially inert chemically to the plastic materials with which they are employed. Examples are traprock dust, chert dust, silica flour ($SiO_2$), Titanium flour ($TiO_2$), aluminum trioxide ($Al_2O_3$), tabular alumina, aluminum silicate, llanite (granite) dust, aluminum trifluoride, haydite, and porphyrite dacite.

That part of the aggregate which is less than 300 mesh is preferably silica flour or titanium dioxide, or a mixture of both. We prefer 20 parts silica to one part titanium dioxide, by weight. Preferably, about 90% of the silica flour and the titanium dioxide passes through 400 mesh screen and the silica flour is virtually free of metallic content, say, less than .5% by weight, to avoid any acceleration of setting of the resin when the silica flour and resin are mixed. Other suitable, finely ground, aggregates are given above.

An important advantage of the material of this invention is that it can be bonded to itself without special preparation of the surfaces, thereby permitting the bonding of one segment or layer of a product to another.

We have found that the use of finely divided aggregate, i.e., that aggregate which passes through 400 mesh screen (especially that in range of about .001 to about 20 microns), made of traprock dust, silica or titanium dioxide, greatly increases the strength of the final product so that it need not be as thick to provide much greater strength than is available with conventional products. The finely divided aggregate also extends the shelf life of the polyester resin and produces an additional bonding action between the resin and larger aggregate, which increases the final strength of the product. The presence of the finely divided aggregate also increases the tolerance of the polyester resin to traces of moisture which are nearly always present in the rice hulls, and which otherwise would interfere with or prevent proper setting of the polyester resin. The fine aggregate also contributes to the effectiveness of bonding of the material to metal, concrete and other materials where such bonding is desirable. In general, any finely divided inorganic aggregate, which does not react detrimentally with the resin, can be used.

The invention will be more fully understood from the following detailed description and the accompanying drawings, in which.

Figure 1:
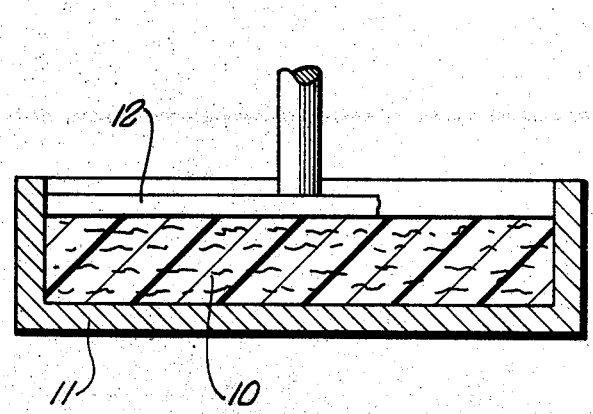
FIG. 1 is a sectional elevation of a mixture of polyester resin cement and rice hulls being cast in a pressure mold.

Typical examples of polyester resin-aggregate compositions and their uses are given below.

EXAMPLE 1

A polyester resin slurry was prepared by stirring in a mixing vessel a mixture having the following composition:

Percent by weight
About 60% by weight of Oronite CR21728 [1] polyester resin (made by reacting 3 mols of isophthalic anhydride with 6 mols of diethylene glycol and 1.5 mols of ethylene glycol until the acid number is less than 5. Four mols of maleic anhydride is then added with 150 p.p.m. hydroquinone and reacted until the acid number is below 20), and about 40% by weight of styrene monomer (the amount of styrene can be increased to about 60% by weight without adverse effect on the final product) _____ 70.85

[1] The Oronite CR21728 is a so-called semiflexible high impact resistance resin. Similar properties are obtained by blending an orthophthalic rigid resin with an orthophthalic flexible resin in a ratio of about 3.0 to 3.9 by weight provided "fine" of at least about 5% by weight of the resin, not including styrene.

Cobalt naphthenate _____ .38
Silica flour (preferably the silica flour has the chemical and has been ground and supplemented with colloidal silica to provide the screen analysis given in Table I below) _____ 7.3
Titanium dioxide _____ 9.53
Styrene _____ 11.94

The above materials are thoroughly mixed with high speed, high shear equipment to provide thorough dispersion of the fine particles, and the mixture is referred to as polyester resin cement mix No. 1. It has a density of 10.5 pounds per gallon.

The composition of the preferred silica flour is shown in Table I below.

TABLE I.—SILICA FLOUR

| Chemical composition | | Particle size | |
|---|---|---|---|
| Component | Percent by weight | Less than, microns | Percent by weight |
| $SiO_2$ | 99.600 | 100 | 100 |
| $Al_2O_3$ | 0.073 | 80 | 90 |
| $Fe_2O_3$ | 0.039 | 60 | 83 |
| $TiO_2$ | 0.28 | 40 | 72 |
| $CaO_2$ | 0.060 | 20 | 47 |
| MgO | 0.010 | 10 | 23 |
| Miscellaneous | 0.050 | 5 | 9 |
| Moisture at 105° C | 0.080 | 1 | 0 |

NOTE: The 53% of particles over 20 micron size is utilized as "aggregates". The 47% of particles under 20 micron size is used as "fine particles" which increases the strength of the final product.

Other examples of fine particle materials which have been used are:

TABLE II.—TITANIUM FLOUR

| Chemical composition | | Particle size | |
|---|---|---|---|
| Component | Percent by weight | Less than, microns | Percent by weight |
| $TiO_2$ | 99.20 | 1 | 100.0 |
| $P_2O_5$ | 0.30 | 0.75 | 97.0 |
| $K_2O$ | 0.22 | 0.50 | 88.5 |
| $SiO_2$ | 0.08 | 0.40 | 78.5 |
| $Al_2O_3$ | 0.01 | 0.30 | 61.0 |
| $Sb_2O_3$ | 0.01 | 0.20 | [1] 17.0 |
| Miscellaneous | 0.18 | | |

[1] Includes particles down to .004 micron.

TABLE III.—TRAPROCK DUST

| Chemical composition | | Particle size | |
|---|---|---|---|
| Component | Percent by weight | Less than, microns | Percent by weight |
| $SiO_2$ | 39.92–40.32 | 100 | 70.0 |
| MgO | 18.12–20.17 | 80 | 59.0 |
| CaO | 10.55–10.68 | 50 | 46.0 |
| $Al_2O_3$ | 8.60–9.46 | 40 | 31.0 |
| FeO | 7.48–8.00 | 20 | 15.5 |
| $Fe_2O_3$ | 4.40–4.75 | 10 | 12.6 |
| $TiO_2$ | 2.66–2.70 | 5 | 0.6 |
| $Na_2O$ | 1.91–2.62 | 1 | 0.0 |
| $K_2O$ | 1.03–1.10 | | |
| $P_2O_5$ | .51–.68 | | |
| MnO | .24–.25 | | |
| Miscellaneous | .28–.41 | | |

NOTE: The 84.5% of particles over 20 microns in size is employed as supplementary aggregates in concrete mixtures. The 15.5% of particles of under 20 micron size is employed as "fine particles", which increases the strength of the final product.

TABLE IV.—ALUMINUM SILICATE (ASP)

| Chemical composition | | Particle size | |
|---|---|---|---|
| Component | Percent by weight | Less than, microns | Percent by weight |
| $SiO_2$ | 45.4 | 20 | 98 |
| $Al_2O_3$ | 38.8 | 10 | 83 |
| $TiO_2$ | 1.5 | 1 | 10 |
| $Fe_2O_3$ | 0.3 | | |
| CaO | 0.1 | | |
| $Na_2O$ | 0.1 | | |
| Ignition loss | 13.8 | | |

TABLE V.—TABULAR ALUMINA

| Chemical composition | | Particle size | |
|---|---|---|---|
| Component | Percent by weight | Less than, microns | Percent by weight |
| $Al_2O_3$ | 99.50 | 44 | 100 |
| $SiO_2$ | .06 | 20 | [1] |
| $Fe_2O_3$ | .03 | | |
| $Na_2O$ | .02 | [1] | [1] |
| Miscellaneous | .39 | [1] | [1] |

[1] Inaccurately determined; estimated at 35%.

Other materials used as fine particle constituents include alumina ($Al_2O_3$), aluminum fluoride ($AlF_3$) and colloidal silica consisting 100% of particle sizes under one micron (from about 0.5 to 0.1 micron).

The use of aggregate materials and fine particles is not limited to the examples stated herein. The essential requirements in each case are that the constituent material possess within itself definite structural characteristics compatible with the end product sought, and that it be free from any detrimental chemical reactivity with the plastic material with which it is employed.

The aggregate used in addition to the silica flour can be any material which does not adversely affect the curing of the polyester resin.

The polyester resin concrete of Example 2 is satisfactory for use at temperatures up to about 80° C. (176° F.).

To make a polyester cement for use at temperatures up to 130° C. (266° F.) Oronite CR20114 polyester resin is substituted for Oronite CR21728 in Example 1. Other chemical and physical properties described above are not materially changed. Oronite CR20114 is an isophthalic unsaturated polyester made by reacting one mol of isophthalic anhydride with 3.41 mols of propylene glycol at 400° F. until the acid number is below 5. Two mols of maleic anhydride are added to the mixture, which is then cooked at 390° F. until the acid number is below 25. The temperature is then raised to 415° F. until the acid number is below 15. 150 p.p.m. of hydroquinone is added with the maleic anhydride.

Other patching cements are prepared by replacing the Oronite CR21728 polyester resin with:

| | Percent by weight |
|---|---|
| Polylite 8037 | 60.00 |
| Polylite 8150 | 40.00 | or

| | |
|---|---|
| Selectron 5835 | 60.00 |
| Polylite 8150 | 40.00 |

Oronite CR21728 is replaced when the polyester cement need not meet the high chemical properties inherent in this resin, nor is there need for as high physical properties.

Polyester resin cement mix No. 1 is used as the cementing agent for casting products made of rice hulls in accordance with this invention. For example, a polyester resin cement-rice hull mixture for casting products is made by mixing the following ingredients:

EXAMPLE 2

| | Parts by weight | |
|---|---|---|
| | Preferred | Satisfactory range |
| Polyester resin cement mix No. 1 | 1.0 | 0.9–1.1 |
| Methyl-ethyl-ketone peroxide [1] | 0.02 | 0.01–0.03 |
| Rice hulls | 6.0 | 3.9–9.0 |

[1] This is preferably blended with the polyester resin mix No. 1 prior to mixing with the rice hulls.

The rice hulls and polyester resin cement mix No. 1 are mixed in a standard concrete or impeller mixer for two or three minutes, or longer if required, to disperse the various particle sizes uniformly throughout the entire mixture and to insure uniform coating of all rice hulls with polyester resin.

The compositions of typical rice hulls used in this invention and the ash of the rice hulls are given in the two following tables:

TABLE VI

| Rice hulls: | Percent by weight |
|---|---|
| Moisture | 2.4–11.0 |
| Ash | 15.7–21.3 |
| Protein | 2.4–3.6 |
| Ether extract | 0.9–1.2 |
| Crude fiber | 39.0–45.7 |
| Nitrogen free extract | 24.7–29.4 |

TABLE VII

| Rice hull ash: | Percent by weight |
|---|---|
| Si | 94.0–94.5 |
| CaO | 0.3–2.3 |
| MgO | 0.2 |
| $K_2O$ | 1.1–3.2 |
| $Na_2O$ | 0.8 |
| $Fe_2O_3$ | Trace–0.1 |
| $SO_3$ | 1.1 |
| $P_2O_5$ | 0.5 |
| Al and Mn oxides | Trace |

The above mixture of rice hulls and polyester resin cement cures at ambient temperature. If delay between mixing and placing the mixture is expected, the initial set may be delayed from fifteen to thirty minutes to from six to eight hours by introducing a conventional retarder, such as hydroquinone, in the polyester resin mix No. 1 when the catalyst is added.

The polyester resin cement-rice hull mixture of Example 2 is satisfactory for use at temperatures up to about 80° C. (176° F.). To make a product for use at temperatures up to 130° C. (266° F.), Oronite CR20114 polyester resin is substituted for Oronite CR21728 in Examples 1 and 2. Other chemical and physical properties described above are not materially changed. Oronite CR20114 is an isophthalic unsaturated polyester made by reacting one mol of isophthalic anhydride with 3.41 mols of propylene glycol at 400° F. until the acid number is below 5. Two mols of maleic anhydride are added to the mixture, which is then cooked at 390° F. until the acid number is below 25. The temperature is then raised to 415° F. until the arid number is below 15. 150 p.p.m. of hydroquinone is added with the maleic anhydride.

To reduce the amount of resin required in the product of this invention, a procedure different from that outlined in Example 2 is followed. In the alternate procedure, all of the styrene set forth in Example 1 is mixed with the rice hulls before the styrene or rice hulls are mixed with the polyester resin and other ingredients. The mixture of rice hulls and styrene is agitated or allowed to set for sufficient time to wet the rice hulls with styrene. Thereafter, the remainder of the ingredients listed in Example 1, and the catalyst given in Example 2, are added to the styrene-wet rice hulls. The resulting mixture is molded under pressure and heat to produce the solid product of this invention. The pressure in the mold can range between about 200 pounds per square inch and about 3000 pounds per square inch, and the temperature is preferably kept below about 170° F.

Referring to FIG. 1, a mixture of rice hulls and polyester resin cement as given in Example 2 is used to cast a body 10 in a mold 11 under pressure applied by a piston 12. After the resin has set in the mold, the pressure is released and the cast body is removed from the mold.

The cast body can be any one of numerous elements, such as drainboards, wall tiles, shingles, corrugated sheets, siding, roofing, deck panels, silo doors and frames.

If desired, the appropriate surfaces of the body are decorated or colored by applying a coating (not shown) of a mixture of polyester resin or polyester resin cement, such as that given in Example 1, and a suitable conventional pigment which is present in the amount of about 5% to about 50% by weight of the coating. The polyester resin or polyester cement and pigment adhere firmly to the surface of the cast body of rice hulls and polyester resin cement. The finished decorated or colored surface is virtually immune to weathering or acid attack.

The rice hulls used in this invention can be either whole or ground. The whole rice hulls have a loose weight per cubic foot of about seven pounds, and the ground rice hulls have a loose weight per cubic foot of about twenty-three pounds.

Another typical example of a polyester resin cement composition used in making the product is given below:

EXAMPLE 3

A polyester resin slurry is prepared by mixing the following composition:

Percent by weight

Combine 1 mol of phthalic anhydride with 2 mols
of maleic anhydride in the presence of an excess
of ethylene or propylene glycol, and reduce the
end result with styrene monomer in the amount of
about 50% by weight in a one-step polymerization process. This resin has an impact strength of
about 1.8 pounds per inch when the measurement is made on unnotched izod ------------ 69.20
Tricresyl phosphate ------------------------ .06
Wax (melting point 120–135° F.) ------------- 1.89
Cobalt naphthenate ------------------------ .38
Silica flour [1] --------------------------- 7.30
Titanium dioxide -------------------------- 9.53
Styrene ---------------------------------- 11.64

[1] Preferably, the silica flour has the chemical and screen analysis given in Table I above.

The above materials are thoroughly mixed, and the mixture is referred to as polyester resin cement mix No. 3. It has a density of about 10.5 pounds per gallon.

The above mixture has an almost indefinite shelf life because of the presence of the finely divided and pure silica flour. It can be used as a substitute for the polyester resin cement of Example 1.

Alternatively, 2 mols of phthalic anhydride combined with 1 mol of maleic anhydride in a two-step polymerization process and reacted in the presence of an excess of ethylene or propylene glycol, the resultant resin being reduced with styrene monomer in an amount of about 40% by weight, results in a resin having an impact strength of about 1.0 foot pound per inch. This resin can be substituted for the one just described to make polyester resin cement of lower impact strength. Calcium sulphate is substituted for the silica flour and titanium dioxide in the above formulation to reduce further the impact strength of the polyester cement.

By proportioning the basic ingredients of the polyester resin with various amounts of styrene monomer, and by adding calcium sulphate in varying amounts, polyester resin cements may be obtained which vary over a wide range of impact strengths. However, when the polyester resin cement is blended with rice hulls to make the final product of this invention, the set product has a relatively high strength for withstanding relatively gradually changing compressive loads, such as imposed by wind-loading, and yet has a low impact strength.

EXPLANATION OF THE STABILIZATION OF LIQUID PLASTIC MATERIALS PRIOR TO CURING AND THE IMPROVEMENT OF THE PROPERTIES OF CURED PLASTIC MATERIALS BY THE USE OF FINELY DIVIDED SOLID PARTICLES OF SUBSTANCES NORMALLY CHEMICALLY INERT TO SUCH PLASTIC MATERIALS

As commercially available for use, the liquid forms of the plastic or resinous materials used in our invention may be described as mixtures of three dimensional high molecular weight polymer or copolymer resin or monomer molecules graded as to size and co-dispersed into a space network or lattice and possessing multiple points of potential attachment. The initially liquid forms of such a mixture are inhibited as to chemical reactivity only partially. For example, in the case of a polyester resin-styrene monomer mixture, hydroquinone (a reducing agent) is introduced for the purpose of donating two hydrogen atoms to inactivate the resin-monomer by preventing the free radicals from attacking the double bonds of unsaturation, or methyl linkage. This stops or delays addition-polymerization until the available hydrogen atoms from the hydroquinone are exhausted. The chemically unstable state of this mixture limits its use in relation to time, temperature and exposure to light. Further, in curing such a mixture by introducing, for example, a catalyst in the form of methyl-ethyl-ketone peroxide it is difficult or impossible to achieve a perfectly balanced reaction. Unsatisfied free radicals remain, resulting in an unstable product in which a degree of addition-polymerization continues to exert a deteriorating effect.

We have discovered that by introducing into the space-network or lattice of molecules of a resin, monomer or resin-monomer mixture modifying finely divided solid particles (especially in the .001 to 20 micron range) of substances normally chemically inert thereto we achieve the following results:

(1) The shelf life of the resinous material in uncured state is extended as much as several times of that of a similar unmodified material.

(2) The chemical reactivity of the curing process is not impaired by introduction of the fine particles.

(3) An increase of as much as several hundred percent in the strengths of resinous materials employed as bonding agents.

(4) The mixture of resinous materials and fine particles may be used with or without aggregates (solid particles above the 20 micron size) to make adhesive coatings of exceptional strength and durability.

(5) Structural characteristics of the cured resinous materials are modified as to adhesion, rigidity and strength as to permit the composition of cements of resinous materials and fine particles which will impart to concrete strength several times that obtained by the use of similar cements without the modifying fine particles. Within the optimum range of effect, the degree of modification is proportional to the ratio of fine particles to total cement, by weight.

(6) Stability in the curing of resinous cements is so improved as to achieve air uninhibited curing accompanied by reduction to a negligible degree of the exothermic heating of curing, with a resulting reduction in stress distortion.

The explanation for the above results is thought to be as follows:

The uncured resinous materials of our invention are mixtures of high molecular polymer or copolymer molecules graded and co-dispersed into a space network or lattice. The resinous materials possess multiple points of potential attachment, which in the past have been only partially and temporarily inhibited as to chemical reactivity. These resinous mixtures exhibit substantial static electrical charges.

The finely divided particles described, consisting of chemical compounds in solid or colloidal state in which the particle sizes range from about 20 microns downward (preferably to .001 micron) take on substantial static electrical charges in much the same manner as the micromolecules and macromolecules of the resinous mixtures.

To stabilize the uncured resinous mixture and inhibit chemical linkage without inducing a chemical reaction, the chemically inert, finely divided charged particles are intimately dispersed within the lattice of the resinous molecules and act similar to ions or radicals in a chemcal compound undergoing a chemical reaction. To the extent of demand, attachment through electrical attraction occur between the particles and the resinous molecules. These attachments largely satisfy the reactive demand of the uncured resinous molecules, inhibit the addition-polymerization process, and substantially increase the shelf life of the resinous mixture.

Upon catalyzation in curing, these attachments by electrical attraction yield, to the extent of demand, to the true chemical reaction. Except as so displaced, the fine particle remains attached (as a group of atoms) to the resinous molecules to give the effect of enlarged macromolecules possessing increased power of attraction to other and similar molecules within the lattice and increased adhesion to the faces of solids to which the mixture is applied. The effect is much the same as though a new substance consisting of a combination of resinous molecules and fine particles, acting jointly, has been created.

The fine particles give cured resinous mixtures strength, rigidity and adhesion to other materials amounting to several times the values inherent in the same resinous mixtures which have been cured without such modification by use of the finely divided particles. The degree of modification of the resinous mixture properties which is achieved by addition of the fine particles is related directly (within optimum limits given below) to the ratio by weight of fine particles to total cement in which the term "total cement" refers to the combination of resinous materials and fine particles.

USE OF FINELY DIVIDED SOLID PARTICLES TO EXTEND THE SHELF LIFE OF PLASTICS AND MONOMERS

A mixture of two orthophthalic high molecular weight polymer polyester resin-styrene monomer products of Cook Paint and Varnish Company (believed to be the products of condensation-polymerization process between phthalic anhydride and adipic acid and propylene glycol and containing 200 p.p.m. of hydroquinone as an inhibitor) had the following properties:

CONTROL MIXTURE

| | Styrene additive, percent | Parts by weight | Manufacturer's rated storage stability |
|---|---|---|---|
| Resin: | | | |
| C-100 (rigid) | 33 | 60 | ¹ 6 |
| C-200 (flexible) | 20 | 40 | ¹ 12 |

¹ Months.

This mixture was placed in pint cans and examined at six month intervals. At the end of the second interval, examination revealed the resin was no longer usable, with polystyrene having formed on top of cured resin in the specimen.

Using the same resin formulations, a test mixture was prepared in which the styrene additive was deliberately increased from 27.7% to 49.3% of the resin, and fine particles were added to stabilize the control mixture as follows:

Test Mixture I (1)

Constituent: Parts by weight
- C-100 Resin _____ 41.22
- C-200 Resin _____ 27.48
- Added styrene _____ 11.64
- Silica flour _____ 7.30
- Titanium flour _____ 9.53
- Colloidal silica _____ .50

The fine particles (those below 20 microns) totaled 13.46 parts constituting 16.70% of the weight of resin-monomer and including 10.03 parts or 75% submicron particles.

This mixture was placed in pint cans and examined at six month intervals. At the end of two years, the mixture was found to be usable, and normal curing resulted from catalyzation with methyl-ethyl-ketone peroxide.

Another test mixture was prepared of the same ingredients by raising the styrene content well beyond the formulator's recommendations for stability as follows:

Test Mixture I (2)

Constituent: Parts by weight
- C-100 Resin _____ 41.22
- C-200 Resin _____ 27.48
- Added styrene _____ 18.51
- Silica flour _____ 17.30
- Titanium flour _____ 9.53
- Colloidal silica _____ .50 resulting in styrene equal to 62% of resins and significant fine particles equal to 18.16 parts constituting 20.8% of the resin-monomer and including 10.03 parts or 55.2% submicron particles.

This mixture was placed in pint cans and examined at regular intervals of three months. At the end of four years, three months, the mixture was found to be usable. At the end of four years, six months, initial deterioration was evidenced. At the end of five years, the mass was still gelatinous, and no polystyrene crystals had formed.

These tests demonstrated that introducing into a resin-monomer mixture finely divided charged particles of inert materials, even though the styrene is well above the resin-styrene cross-linking capacity, (a) Extended the shelf life of the resinous material several times that of similar unmodified materials, and (b) The chemical reactivity of the curing process was not impaired by introduction of the fine particles.

Ideally, for the more common purposes of our invention, we employ an isophthalic resin with about 50% styrene additive stabilized as follows:

EXAMPLE 4

Constituent: Parts by weight
- Resin-monomer _____ 100
- Chemically inert fine particles
  (less than 20 microns) about _____ 110
- Including submicron particles
  of about _____ 10

The foregoing shows that fine particles in an amount of some 15% to 20% by weight of the resin-monomer mixture were effective in stabilizing the uncured resinous material in storage. About 10% of the submicron size is desirable for achieving an intimate mixture and desirable suspension in the resinous material in storage. The figure of 110% (by weight of the resin) of fine particles, of which 10% is of submicron size, is an approximate maximum which may be used without impairing the mixture of resin-monomer and fine particles as a cement ingredient in the cured state. Addition of inert particles ranging upward from about 20 micron size, i.e., aggregate, does not impair the quality of the mixture.

USE OF FINELY DIVIDED SOLID PARTICLES TO IMPROVE THE QUALITIES OF RESINOUS ADHESIVE COATINGS

The high polymer or copolymer resins and resin-monomer mixtures, used without modification as adhesive coatings or protective coatings, have proven unsatisfactory because bond strengths are weak and unreliable and stability is seriously influenced by exposure to heat and light.

Finely divided particles of inert solids mixed with resinous compounds make adhesive or protective coatings of improved stability and strength over those of the resinous mixtures alone. In making such a coating to be applied, say, to a metallic surface, fine particles (under 20 micron side) are utilized to modify the characteristics of the resinous mixture. Larger particles than 20 microns and possessed of little or no effective static charge may be employed as aggregates. These and the metallic surfaces afford faces of attachment. The optimum use of the finely divided particles in combination with larger particles effects a more perfect gradation of particle size and results in a great uniformity of resin-monomer mixture distribution, and minimum film thickness thereof on the planes of surfaces to which it is applied. Hence, there is a more uniform distribution of strength on the plane of attachment, accompanied by a material reduction of the exothermic heating, reducing curing stresses and distortion to a negligible factor.

When the catalyst of the curing process has been used to optimum effect by the resinous molecules, the finely divided charged particles neutralized remaining free radicals, and stop addition-polymerization. A degree of stability of the cured mixture is thus achieved that is otherwise impossible of accomplishment through conventional chemical methods and processes hitherto employed.

We composed, using 100 parts of resin-monomer, the following mixture:

EXAMPLE 5

| Constituents: | Parts by weight |
| --- | --- |
| C–100 Resin (exclusive of styrene) | 38.57 |
| C–200 Resin (exclusive of styrene) | 28.50 |
| Styrene monomer (total) | 32.93 |
| Inert aggregates (−100 mesh to +20 microns) | 5.45 |
| Fine particles | 27.38 | in which the significant fine particles constituted 27.38% by weight of the resin-monomer mixture including 14.41% of submicron particles all conforming to the analysis given in following Table VIII:

TABLE VIII.—FINE PARTICLE ANALYSIS OF EXAMPLE 5

| Chemical composition | | Particle size | |
| --- | --- | --- | --- |
| Component | Percent | Less than, microns | Percent by weight |
| $TiO_2$ | 47.22 | 20 | 100 |
| $SiO_2$ | 37.20 | 1 | [1] 52.6 |
| $Al_2O_3$ | 15.29 | | |
| $P_2O_5$ | .141 | | |
| $K_2O$ | .103 | | |
| $Fe_2O_3$ | .019 | | |
| $CaO_2$ | .012 | | |
| $Sb_2O_3$ | .005 | | |
| $Na_2O$ | .004 | | |
| $MgO$ | .002 | | |

[1] Includes particles down to .004 micron.

A portion of this mixture was catalyzed with 1% of methyl-ethyl-ketone peroxide and placed before curing on the flanges of two sections of 6″ x 6″ x 6″ I-beams, the surfaces of which had been sandblasted clean to "white" metal. One section was fixed in a level position and coated and the other was coated on the cleaned surface and laid on top of the first. Excess of the adhesive mixture squeezed out by the weight of the upper section was cleaned from the edges. After forty-eight hours of curing, a direct tensile force of 100,000 pounds was applied by means of lugs attached to the opposite faces of the beam sections without producing bond failure. The specimen was preserved or "aged" for about eighteen months and retested with a load of 275,000 pounds without producing a bond failure. The demonstrated bond strength of some 7,600 p.s.i. compares with a variable and unreliable bond strength in the range of 500 to 2,000 p.s.i. for similar but unmodified resins. The difference is achieved by modification of the properties of the cured resin-monomer mixture through the use of inert finely divided charged particles.

In modifying basic resins by introducing fine particles into the lattice we have found that a combination of different fine particle materials appears to add to the complexity of the resin-monomer molecular structure, thereby increasing its molecular weight and resulting in an increase of strength by comparison with results obtained from a single simple fine particle material. The fine particle constituent of Example 5 as delineated in Table VIII was obtained through a combination of the fine particles of Table I (Silica Flour), Table II (Titanium Flour), Table IV (Aluminum Silicate), and colloidal silica. The principal constituents varied as to molecular weight and magnetic susceptibility as follows:

| | Percent by weight | Rounded molecular weight | Magnetic susceptibility |
| --- | --- | --- | --- |
| Substance: | | | |
| $SiO_2$ | 47.45 | 60 | Negative. |
| $TiO_2$ | 37.28 | 80 | Positive. |
| $Al_2O_3$ | 14.97 | 102 | Negative. |

In this relatively complex formulation, we effectively used fine particles in an amount of 27% by weight of a relatively weak resin-monomer to achieve a strong and stable adhesive. This would not be feasible with fine particles of simpler character even though stronger basic resins were utilized. To illustrate, Reichhold Chemical Company's Polylite isophthalic resins, as described in following Table IX, were employed in a series of formulations.

TABLE IX.—PHYSICAL PROPERTIES OF POLYLITE RESINS

| | Rigid resin 93-419 | Flexible resin 31-830 |
| --- | --- | --- |
| Properties of unfilled resins: | | |
| Styrene additive | [1] 40 | [1] 30 |
| Flexural strength, p.s.i | 17–18,000 | Yields. |
| Flexural modulus, p.s.i | 6–7×10⁵ | Do. |
| Heat distortion, temperature ° C | 111 | Do. |
| Compressive strength, p.s.i | 26–27,000 | Do. |
| Tensile strength, p.s.i | 8–9,000 | 2.5–3,000 |
| Barcol hardness | 50–55 | |

[1] Percent.

Coating formulations were made by increasing the styrene additive to 50% in each case and varying the proportions of the two resins and the character and content of the fine particles. Three inch steel bars were cut, the surfaces milled, sandblasted clean and then joined with the adhesive formulations and tested in direct tension to determine the optimum quantities of modifying fine particles and the strengths developed through use of two fine particle ingredients. The results are given in following Table X:

TABLE X

[Adhesive Test Results from a Given-Resin-Monomer and Two Fine Particle Constituents (50% rigid resin with 50% styrene additive)]

| Mix No. | Resin-monomer, parts by weight | Fine particles Composition | Fine particles Parts by weight | Aggregate, parts by weight | Adhesive strength, p.s.i. |
|---|---|---|---|---|---|
| 1 | 100 | $SiO_2$ | 0 | 0 | 49,429 |
|   |     | $TiO_2$ | 21.95 |   |   |
| 2 | 100 | $SiO_2$ | 3.44 | 3.88 | 5,023 |
|   |     | $TiO_2$ | 14.64 |   |   |
| Total |   |   | 18.08 |   |   |
| 3 | 100 | $SiO_2$ | 5.16 | 5.82 | 4,860 |
|   |     | $TiO_2$ | 10.98 |   |   |
| Total |   |   | 16.14 |   |   |
| 4 | 100 | $SiO_2$ | 6.88 | 7.76 | 4,670 |
|   |     | $TiO_2$ | 7.32 |   |   |
| Total |   |   | 14.20 |   |   |
| 5 | 100 | $SiO_2$ | 8.60 | 9.70 | 4,478 |
|   |     | $TiO_2$ | 3.66 |   |   |
| Total |   |   | 12.26 |   |   |
| 6 | 100 | $SiO_2$ | 2.14 | 2.41 | 4,720 |
|   |     | $TiO_2$ | 9.09 |   |   |
| Total |   |   | 11.23 |   |   |
| 7 | 100 | $SiO_2$ | 3.44 | 3.88 | 4,955 |
|   |     | $TiO_2$ | 14.64 |   |   |
| Total |   |   | 18.08 |   |   |
| 8 | 100 | $SiO_2$ | 4.16 | 4.69 | 5,070 |
|   |     | $TiO_2$ | 17.72 |   |   |
| Total |   |   | 21.86 |   |   |
| 9 | 100 | $SiO_2$ | 4.95 | 5.58 | 5,250 |
|   |     | $TiO_2$ | 21.05 |   |   |
| Total |   |   | 25.00 |   |   |
| 10 | 100 | $SiO_2$ | 5.79 | 6.53 | 5,320 |
|    |     | $TiO_2$ | 24.66 |   |   |
| Total |   |   | 30.45 |   |   |
| 11 | 100 | ASP | 13.23 |   | 4,600 |
|    |     | $TiO_2$ | 4.41 |   |   |
| Total |   |   | 17.64 |   |   |
| 12 | 100 | ASP | 18.75 |   | 5,410 |
|    |     | $TiO_2$ | 6.25 |   |   |
| Total |   |   | 25.00 |   |   |
| 13 | 100 | ASP | 25.00 |   | 5,160 |
|    |     | $TiO_2$ | 8.33 |   |   |
| Total |   |   | 33.33 |   |   |
| 14 | 100 | ASP | 8.82 |   | 3,300 |
|    |     | $TiO_2$ | 8.82 |   |   |
| Total |   |   | 17.64 |   |   |
| 15 | 100 | ASP | 12.50 |   | 5,140 |
|    |     | $TiO_2$ | 12.50 |   |   |
| Total |   |   | 25.00 |   |   |
| 16 | 100 | ASP | 16.67 |   | 3,190 |
|    |     | $TiO_2$ | 16.67 |   |   |
| Total |   |   | 33.34 |   |   |

Figure 2:
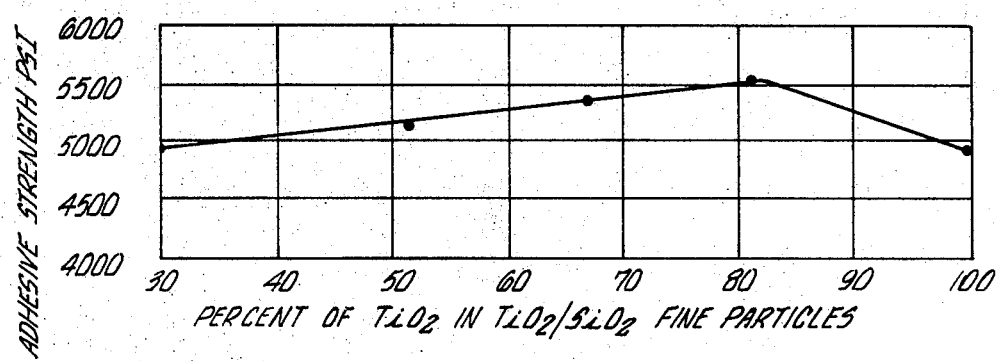
FIGS. 2 through 4 are graphs showing the effect of fine particles used on various properties of resinous mixtures in accordance with this invention.

Mix formulations Nos. 1 to 5 in Table X show, that in using fine particles composed of $TiO_2$ and $SiO_2$ as modifiers, an optimum ratio of utilization occurs at the value of 4.25 as represented by Mix No. 2 and shown in FIG. 2.

Figure 3:
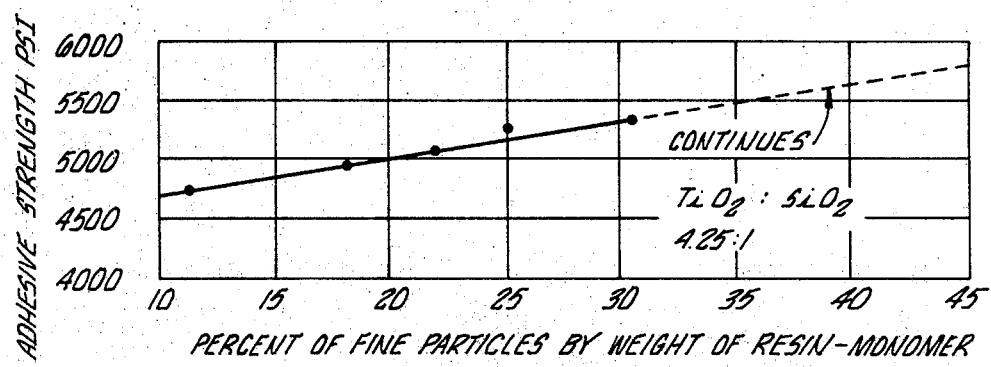

Mix formulations Nos. 6 to 10 show, that in using the optimum 4.25 ratio of the two materials, improvement in strength occurred with increased quantity of fine particles throughout the range which extended past 30% as shown in FIG. 3 up to 5,300 p.s.i.

Referring to the maximum quantity (as a percent of resin-monomer) of a given mixture of fine particles which will produce increasing strength as the "tolerance limit" for such mixture, it is seen that:

(A) Within the "tolerance limit" the improvement obtained from a given quantity of fine particles of optimized mixtures is greater in all cases than from an equal amount of unoptimized mixtures. (Compare Mix No. 1 with No. 8.)

(B) The "tolerance limit" for optimized mixtures is greater than for unoptimized mixtures. (Compare Mix No. 10 with No. 12 and No. 15.)

Figure 4:
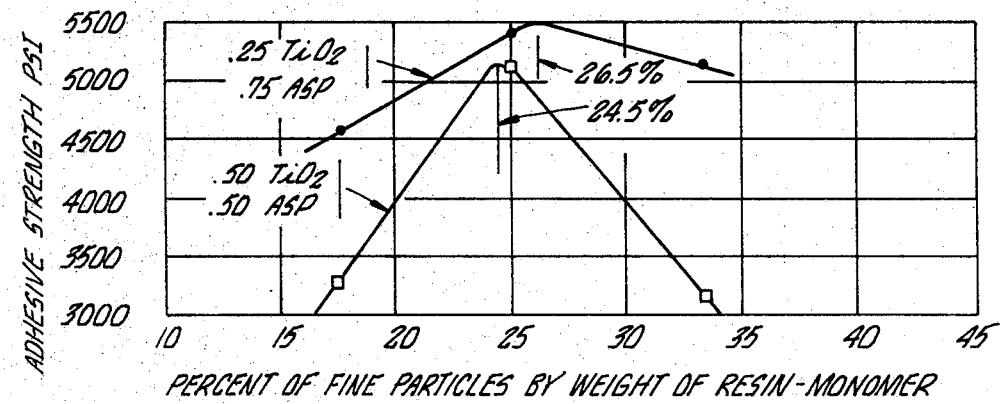

(C) The "tolerance limit" is greater for multiple than for simple constituents. (Compare FIG. 3 with FIG. 4.)

Comparing these adhesive values and numerous others obtained by use of single and double constituent fine particles with semi-rigid to full rigid resinous materials, the values, up to 5300 p.s.i., are in all cases less than those obtained from the unoptimized mixture of Example 5 in which a multiplicity of fine particles was employed.

As shown below in connection with concrete cements, the "tolerance limits" of resin-monomer mixtures for modifying fine particles lie in the range of about 90% to 110% of the weight of the resinous material, depending upon the complexity of fine particle constituents. In composing adhesive or protective coatings, a practical limitation is imposed by the wetting ability of the resinous material. Coatings must be sufficiently fluid to readily wet the fine particles and the surfaces to which the coating is applied when brush, squeegee or spray application procedures are employed. The preferred method of application to porous substrates is by stiff brush or squeegee to work the coating material into the voids and pores or surface irregularities to obtain complete coverage and maximum anchorage of the coating. For dense substrates such as steel the preferred method of application is by the airless spray equipment to drive the coating into all surface irregularities and to avoid incorporation of air bubbles which may lead to penetration of the coat by corrosive substances or to weakening of the bond by voids. While optimum modification of the resinous material by use of fine particles is desirable in a coating to achieve maximum strength, other characteristics necessary to a workable coating mixture may dictate utilization of a somewhat lesser quantity of fine particles in the coating mixtures.

Accepting this limitation, coatings are composed of resinous materials, fine particle constituents and in some cases agregates, each component of which contributes to the end result sought. In citing the following examples, it is not intended that the invention be limited to the chemical composition of the fine particle constituents or to hose of the resinous mixtures cited, nor to the quantities of each employed.

A protective coating for structural steel in salt atmosphere is made as follows:

EXAMPLE 6

| Ingredient | Parts by weight |
|---|---|
| Resin: Isophthalic polyester, 25% to 50% rigid, about 33% to 50% styrene additive | 100 |
| Fine particles: TiO₂/SiO₂ in the ratio of about 4.25:1 | 30–110 |
| Aggregate: Rice hulls | (¹) |
| Pigment: As required to produce desired color. | |

¹ As required.

A high-strength adhesive coating for bonding two steel bodies together is made as follows:

EXAMPLE 7

| Ingredient | Parts by weight |
|---|---|
| Resin: Isophthalic polyester, 50% to 100% rigid, about 33% to 50% styrene additive | 100 |
| Fine Particles: Preferably a multiplicity of constituents, for example a combination of TiO₂, SiO₂, and Al₂SiO₃ | 30–110 |
| Aggregate: Rice hulls as required for the end use. | |

From the foregoing examples, it is obvious that the composition of coatings as contemplated under our discovery involves the selection of resinous constituents, fine particle constituents and, if used, aggregate constituents, each possessing fundamental characteristics compatible with the qualities sought in the end product. Depending upon chemical and physical environment to which a coating of our invention may be subjected, one or more of the following plastic substances may be used in lieu of the polyester resin-styrene monomer mixture of the cited examples:

Thermosetting resins:
 Epoxies
 Aminos
 Alkyds
 Phenolics
 Urethanes
 Allylics
 Silicones
 Cross-linked polyethylene
 Vinyl ester Thermoplastic resins:
 Nylon
 Polycarbonates
 Acrylics
 Acetals
 Vinyls
 Cellulosics
 Styrenes
 Chlorinated polyethers
 Fluorocarbons
 Polypropylene
 Polyethylene

OPTIMIZATION OF FINE PARTICLES

Considering the cement as being composed of the combination of the resinous materials plus fine particles, (1) The modifying effect of the fine particles, within the optimum range of usage, is essentially proportional to the ratio of fine particles to total cement (by weight).

(2) The maximum modification is achieved when the range of fine particles extends continuously from 20 micron to submicron size and the ratio of fine particle constituents is optimized.

(3) Beyond the optimum values an increase in the ratio of a given mixture of fine particles to total cement is detrimental to strength.

The product made in accordance with this invention has good aging characteristics, and is inert to moisture. Moreover, the rice hulls do not deteriorate like some wood particles because there is no "wicking" or capillary attraction of water into the hulls.

We claim:

1. A building material comprising a mixture of rice hulls, the reaction product of an ethylenically unsaturated alkyd resin and a polymerizable vinyl monomer, and finely divided inorganic particles graded in size from about 0.001 to about 20 microns, the rice hulls being bonded together by the said reaction product, the rice hulls being present in the amount of about 40% to about 95% by weight based on said building material and the fine particles being present in the amount between about 1% and about 60% by weight of the combined weight of the polyester resin and fine particles.

2. A building material according to claim 1 which includes one part of the reaction product, between about .1 and about 1.1 parts fine particles and between about 3 and about 9 parts rice hulls.

3. A building material according to claim 1 in which the fine particles are a mixture of silica and titanium dioxide.

4. A method for making a body of building material, the method comprising the steps of mixing rice hulls with styrene to wet the hulls, thereafter mixing the styrene-wet rice hulls with an ethylenically unsaturated alkyd resin containing fine inorganic particles graded in size from about 0.001 to about 20 microns, and thereafter curing the resulting mixture to bond the rice hulls together with the reaction product of the resin and the styrene to form a solid mass.

References Cited

UNITED STATES PATENTS

| 2,645,587 | 7/1953 | Williamson. |
| 2,751,775 | 6/1956 | Sergovic. |
| 3,073,710 | 1/1963 | Morrow et al. |
| 3,078,249 | 2/1963 | Russell. |
| 3,112,283 | 11/1963 | Hansen et al. |

OTHER REFERENCES

Chem. Abst. 52: 782(b), "Rice Hulls as a Raw Material for the Manufacture of Plastics," Machado.

WILLIAM H. SHORT, Primary Examiner
E. WOODBERRY, Assistant Examiner

U.S. Cl. X.R.

166—233; 260—17.4, 40

PO-1050
(5/69)

UNITED STATES PATENT OFFICE
CERTIFICATE OF CORRECTION

Patent No. __3,554,941__  Dated __January 12, 1971__

Inventor(s) __William R. Varnell and Mance R. Mitchell__

It is certified that error appears in the above-identified patent and that said Letters Patent are hereby corrected as shown below:

```
Col.  1, line 35 - after "1967," insert --now abandoned--;
Col.  4, line 44 - after '"fine' insert --particles" less than
                   about .5 microns are present in the amount--
Col.  5, Table III - under the heading "Less than, microns"
                     line 3, change "50" to --60--;
Col.  6, Example 2 - under the heading "Satisfactory range",
                     line 3, change "3.9-9.0" to --3.0-9.0--;
         Example 2 - first line of footnote¹ change "The" to
                     --the--;
Col.  7, line  7 - change "arid" to --acid--;
         line 62 - after "1.8" insert --foot--;
Col.  9, line 37 - change "chemcal" to --chemical--;
         line 39 - change "attachment" to --attachments--;
         line 73 - change "process" to --processes--;
Col. 10, line 61, change "." to --,--;
         line 62 - change "Extended" to --extended--;
         line 64 - change "The" to --the--;
Col. 11, line 35 - change "great" to --greater--;
         line 44 - change "neutralized" to --neutralize--;
Col. 13, directly under Table X delete the hyphen between
                   "Given" and "Resin";
         Table X, under the heading "Adhesive strength, p.s.i.'
                   first line, change "49,429" to --4,429--;
         Table X, under the heading "Parts by weight" the tota:
                   under Mix No. 5 should be double underlined
Col. 15, line 16 - delete "the" (second occurrence);
         line 28 - change "agregate" to --aggregate--;
         line 31 - change "hose" to --those--.
```

Signed and sealed this 3rd day of August 1971.

(SEAL)
Attest:

EDWARD M. FLETCHER, JR.
Attesting Officer

WILLIAM E. SCHUYLER, JR.
Commissioner of Patents